United States Patent [19]

Strawczynski et al.

[11] Patent Number: 5,345,597
[45] Date of Patent: * Sep. 6, 1994

[54] CALL SET-UP IN A RADIO COMMUNICATION SYSTEM WITH DYNAMIC CHANNEL ALLOCATION

[75] Inventors: Leo Strawczynski; Howard M. Sandler, both of Ottawa; Gregory L. Plett, North Gower; David G. Steer, Nepean, all of Canada

[73] Assignee: Northern Telecom Limited, Montreal, Canada

[*] Notice: The portion of the term of this patent subsequent to Jan. 4, 2011 has been disclaimed.

[21] Appl. No.: 40,395

[22] Filed: Mar. 30, 1993

Related U.S. Application Data

[63] Continuation of Ser. No. 658,623, Feb. 21, 1991, abandoned.

[30] Foreign Application Priority Data

Oct. 17, 1990 [CA] Canada .................................. 2027826

[51] Int. Cl.$^5$ .......................... H04Q 7/00; H04B 7/26
[52] U.S. Cl. .................. 455/34.1; 455/34.2; 455/54.2; 455/62; 455/161.3
[58] Field of Search ................ 455/34.1, 34.2, 54.1, 455/54.2, 62, 63, 67.1, 161.3, 32.1, 53.1; 379/61, 63; 340/825.44

[56] References Cited

U.S. PATENT DOCUMENTS

| | | | |
|---|---|---|---|
| 4,628,152 | 12/1986 | Akerberg | 379/51 |
| 4,672,657 | 6/1987 | Dershowitz | 455/34 |
| 4,771,448 | 9/1988 | Koohgoli | 379/60 |
| 5,056,109 | 10/1991 | Gilhousen et al. | 455/54 |
| 5,093,924 | 3/1992 | Toshiyuki et al. | 455/54 |

OTHER PUBLICATIONS

CCIR Interim Working Party 8/13 entitled "Report on Sharing Criteria between FPLMTS and Other Services".

*Primary Examiner*—Reinhard J. Eisenzopf
*Assistant Examiner*—Chi H. Pham
*Attorney, Agent, or Firm*—Jean-Pierre Fortin

[57] ABSTRACT

The call set-up technique of this invention is characterized by the use of channel information from both base station and subscriber terminal in determining the radio traffic channel upon which to set-up a new call. Communication between the base station and subscriber terminal is carried out on a signalling channel until the traffic channel is chosen. Calls are set-up so that they proceed on the radio channel which, of a set of channels under consideration by the subscriber terminal, contains the least amount of interference as measured at the subscriber terminal. The set of channels under consideration by the subscriber terminal is a subset of the entire set of channels allocated to the service. This subset is comprised of those channels having little interference, as measured by the base station. The call set-up technique thereby assures that calls proceed on channels containing little interference from the viewpoints of both base station and subscriber terminal.

8 Claims, 6 Drawing Sheets

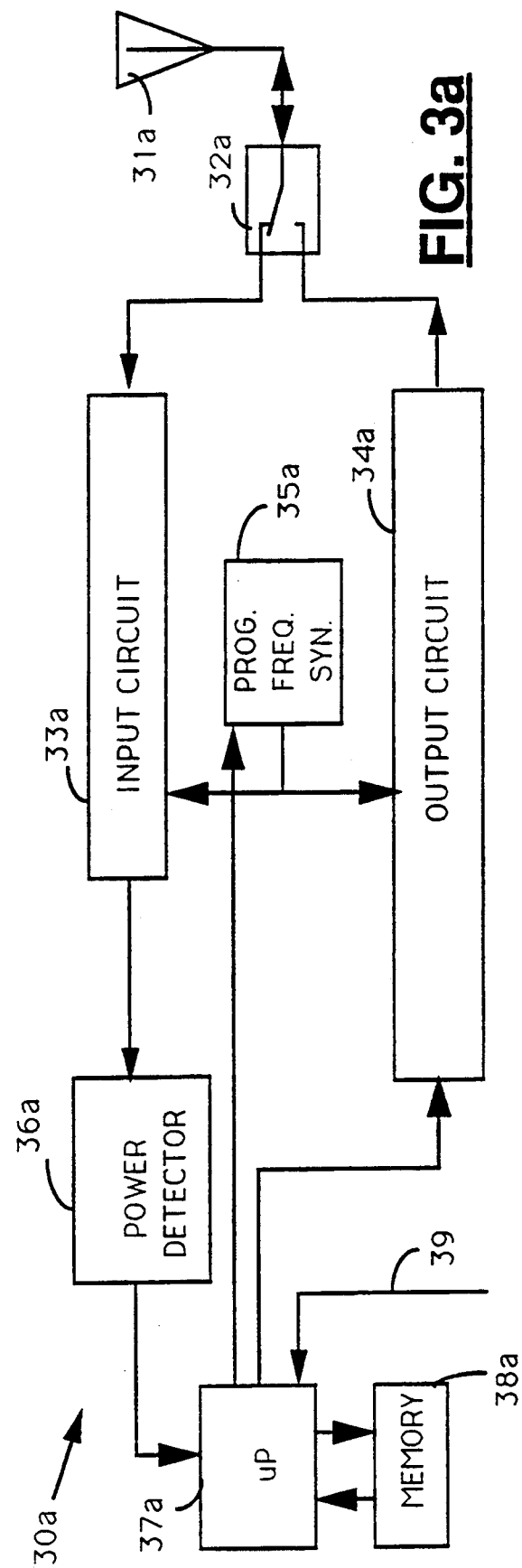

5,345,597

CALL SET-UP IN A RADIO COMMUNICATION SYSTEM WITH DYNAMIC CHANNEL ALLOCATION

This is a continuation of application Ser. No. 07/658,623 filed on Feb. 21, 1991 now abandoned.

FIELD OF THE INVENTION

This invention relates to radio communication systems which use dynamic channel allocation, especially, but not restricted to, cellular radio systems.

DESCRIPTION OF THE PRIOR ART

A duplex radio link conveying user analogue and/or digital information shall henceforth be referred to as a "call". An example is a telephone call over a wireless channel.

Cellular radio communication systems are able to service a high volume of traffic with a limited amount of radio spectrum by re-using the same radio channels in sufficiently separated cells. In conventional city-wide mobile cellular systems, such as the North American Advanced Mobile Phone System, the frequency allocations for a specific cell are fixed; i.e., each cell can make use of only a specified subset of channels of those allocated to the entire service. The allocations of channels require careful engineering analyses of radio propagation conditions and traffic patterns within and between the cells. Fixed allocation cellular radio systems are engineered so that harmful levels of interference from signals used in neighbouring cells are unlikely to be encountered.

Micro-cellular radio systems tend to use dynamic, rather than fixed, channel allocation. With dynamic channel allocation (DCA) each cell can potentially use any traffic channel for a given call of those allocated to the entire service. The decision as to which channel to use is made dynamically, i.e., based on channel usage conditions experienced at the time of call set-up. The decision is also made in a decentralized manner, i.e., by the base station or subscriber terminal in question, without any centralized coordination with other cells. This has the advantages that no detailed engineering analyses are required for each cell site, cell sites can be easily added or moved, and more traffic can be handled than with fixed allocation because channels unused in neighbouring cells can be "borrowed".

Examples of radio systems which use DCA are the digital U.K. CT2 system, and some models of analogue North American 46/49 MHz cordless telephones. In present systems incorporating DCA, the determination of which channel is used for a call set-up is made according to channel information from either the base station or the subscriber terminal. The disadvantage with this approach is that appreciable interference may be present on that channel from the viewpoint of the other end of the link. For example, a traffic channel may have little appreciable interference, as monitored by the base station. However, the same traffic channel may have unacceptable interference at the subscriber terminal. Therefore, the presence of interference may reduce the quality of the link and also make it more susceptible to any further channel impairments which might arise.

U.S. Pat. No. 4,628,152 which issued to Akerberg, discloses a method and apparatus for the establishment of telephone calls to a portable, wireless telephone set. Traffic channels are scanned by a first unit requesting a call connection. Once a useable, i.e. primarily idle, radio speech channel is found, the calling code of the useable radio speech channel is sent to a second unit over a signalling channel. At the second unit, the code of the radio channel is received. A check is made to see if the radio channel is also idle. If it is idle, the calling code is sent back to the first unit and a call connection is made. If it is not idle, the second unit scans the traffic channels for an idle traffic channel and answers the first unit with the selected channel calling code. This procedure is repeated until an idle traffic channel is found.

The problem with this approach is that it is inefficient since it may require several rounds of query and response before the two units agree on a traffic channel. The process could unnecessarily tie-up the signalling channel.

There is accordingly a need for a call set-up protocol which allows for the selection of traffic channels which are suitable for transmission at the both ends of a transmission link without unnecessary delays in call set-up.

SUMMARY OF THE INVENTION

Accordingly, it is an object of the present invention to provide an improved method for performing call set-up in radio systems with DCA, in which a traffic channel is selected according to channel information from both base station and subscriber terminal.

The call set-up procedures of this invention require that there be one or more radio signalling channels. For either an incoming or outgoing call set-up, the base station passes a list of available traffic channels which have low interference from its perspective to the subscriber terminal over a signalling channel. The subscriber terminal checks these candidates, chooses one or more traffic channels which have low interference from its perspective, from among the candidates, and reports these choices to the base station over a signalling channel. In the preferred embodiment these are the channel having the lowest interference level as well as the channel having the second lowest interference level in that order. The call then proceeds on the traffic channel determined to have the lowest interference level.

Therefore, it is an aspect of the present invention to provide a method of selecting a traffic channel for completing a call set-up between a base station and a subscriber terminal, comprising the steps of:

selecting, from a plurality of traffic channels available for service, traffic channels determined to be useable at the base station;

sending a message, to the subscriber terminal, along a signalling channel linking the base station and the subscriber terminal, the message being indicative of traffic channels determined to be useable at the base station;

receiving the message at the subscriber terminal;

selecting, from the traffic channels indicated in the message, a traffic channel determined to be useable at the subscriber terminal;

forwarding a response message, to the base station, along the signalling channel, the response message being indicative of which traffic channel was determined to be useable at the subscriber terminal;

switching the base station and the subscriber terminal to the selected useable traffic channel; and proceeding with call connection.

Another aspect of the present invention is to provide a system for selecting a traffic channel for completing a call set-up between a base station and a subscriber terminal, comprising:
- means for selecting, from a plurality of traffic channels available for service, traffic channels determined to be useable at the base station;
- means for sending a message, to the subscriber terminal, along a signalling channel linking the base station and the subscriber terminal, the message being indicative of traffic channels determined to be useable at the base station;
- means for receiving the message at the subscriber terminal;
- means for selecting, from the traffic channels indicated in the message, a traffic channel determined to be useable at the subscriber terminal;
- means for forwarding a response message, to the base station, along the signalling channel, the response message being indicative of which traffic channel was determined to be useable at the subscriber terminal; and
- means for switching the base station and the subscriber terminal to the selected useable traffic channel.

BRIEF DESCRIPTION OF THE DRAWINGS

FIGS. 3a and 3b are simplified block diagrams of a base station and a subscriber terminal for use with the present invention.

DESCRIPTION OF THE PREFERRED EMBODIMENT

Figure 1:
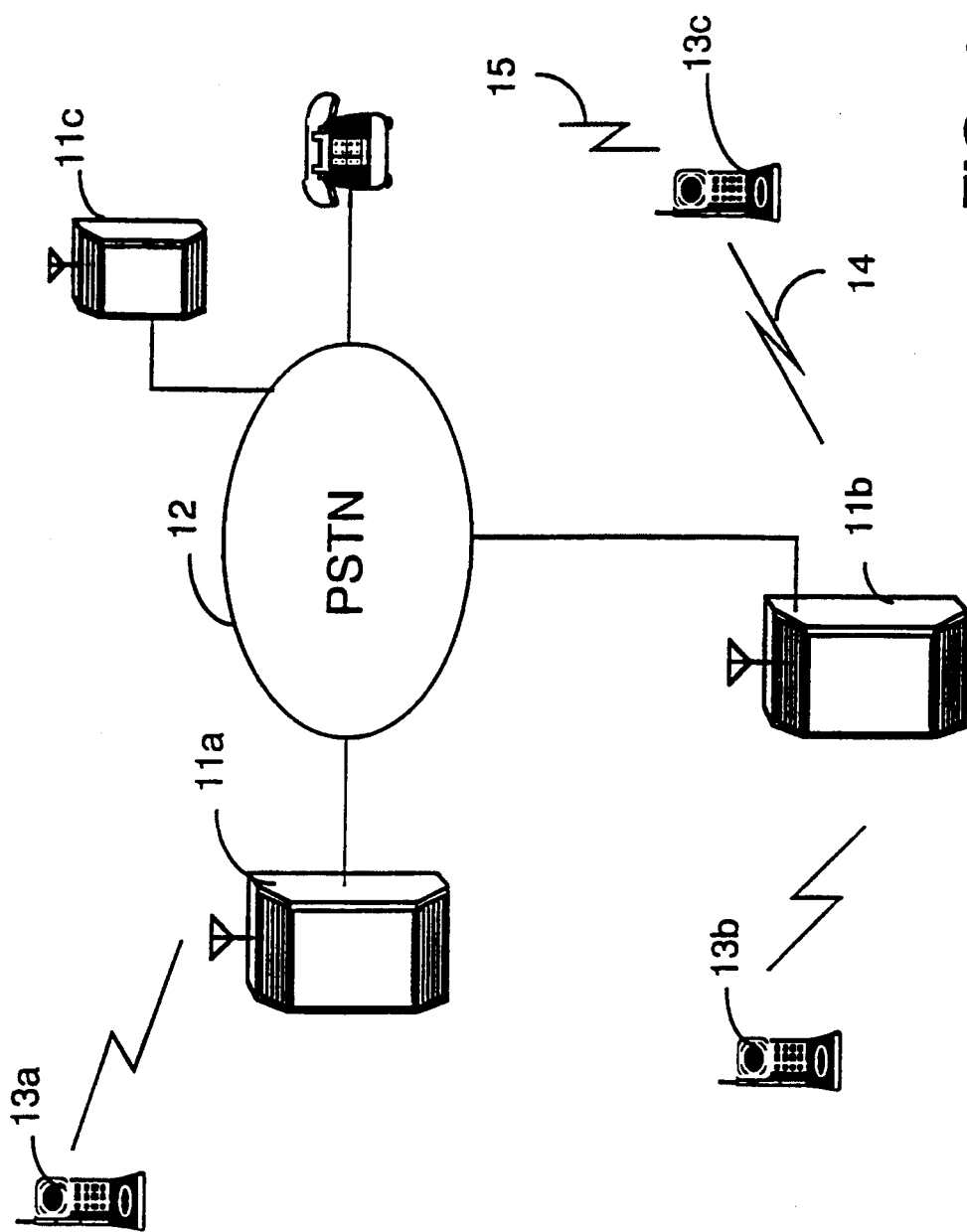
FIG. 1 is an illustration of a radio system embodying the invention.

In the illustration of FIG. 1, a low-power wireless communication system is shown. A typical network can consist of small base stations 11a, 11b and 11c, connected to the Public Switched Telephone Network (PSTN) 12. The base stations are basically used as radio transceivers. These can be deployed in offices, residences, and public areas, such as airports, gas stations and shopping malls, etc. The base stations 11a, 11b and 11c, form the interface between a number of subscriber terminals such as portable handsets 13a, 13b and 13c and PSTN 12. Several base stations can also be linked to a host, such as a private branch exchange PBX (not shown) to provide coverage of larger areas in, say, a private business or office building. Such a wireless PBX system is disclosed in U.S. Pat. No. 4,771,448.

It has been demonstrated that a radio link 14 between base station 11b and subscriber terminal 13c may be established which, although it may be free of interference at the base station 11b, may be affected by interference 15 at the subscriber end of the link, therefore reducing the overall quality of link 14.

With the embodiment of the present invention, the base station. 11b would scan all available traffic channels, and select traffic channels that are useable or free of interference at the base station's end of the link. A list of traffic channels is made and forwarded to subscriber terminal 13c via a signalling channel (not shown) linking the base station and the subscriber terminal. Once received, the list of useable traffic channels, is scanned by subscriber terminal 13c. The subscriber terminal can then select traffic channels which are also free of interference at the subscriber end of the link. In the preferred embodiment, the traffic channel with the lowest level of interference is selected. The traffic channel with the second lowest level of interference is also sent. The selection of a second traffic channel as described above can be useful for hand-over purposes as is described in a co-pending application.

A description of signalling and traffic channel allocation in a low power radio communication system is disclosed in co-pending application having Ser. No. 568,148, filed on Aug. 16, 1990.

Figure 2:
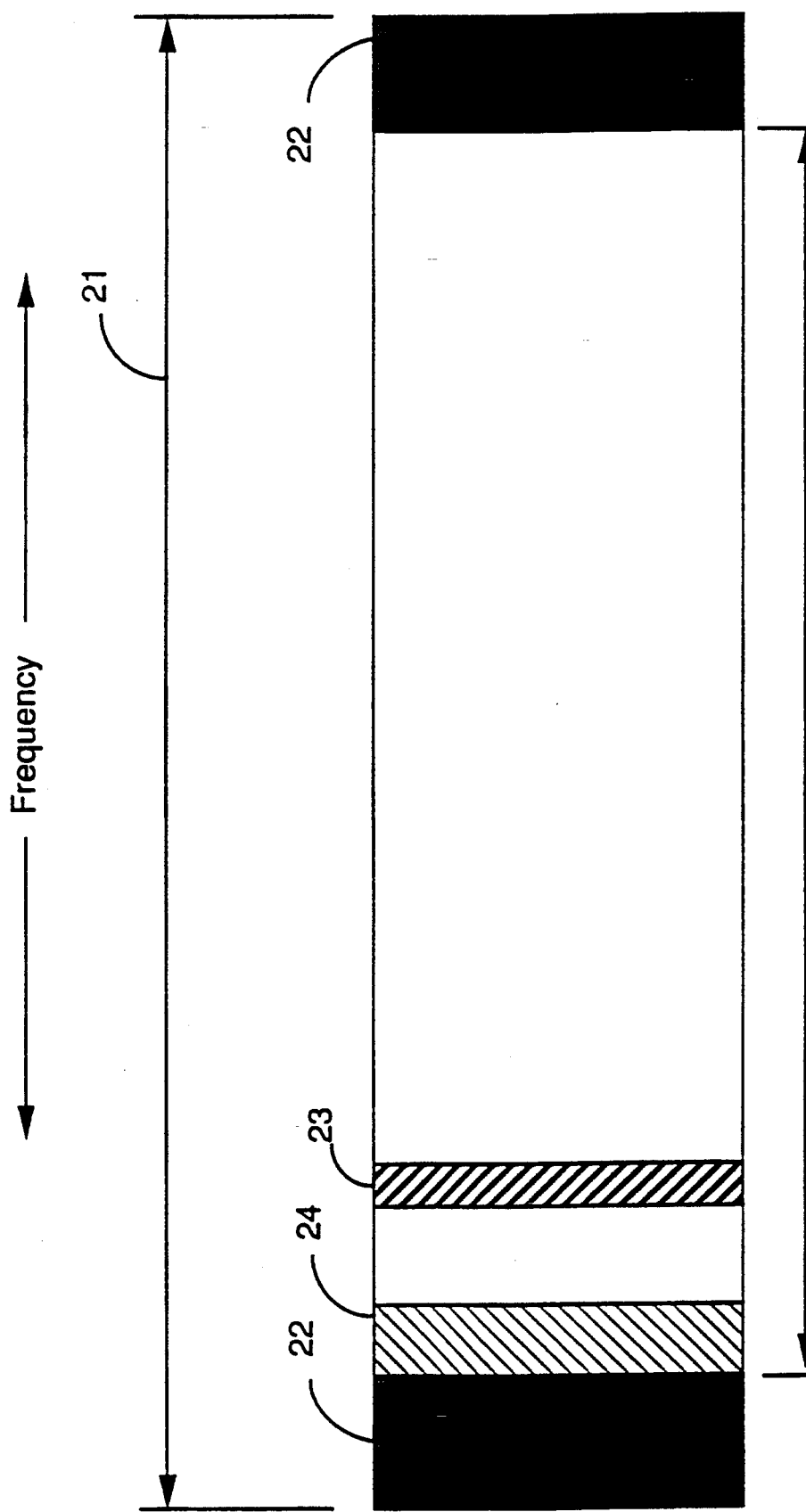
FIG. 2 is an illustration of a frequency plan for a radio system embodying the invention.

FIG. 2 depicts an example of frequency allocation for a wireless communication system. In this example, the larger band 21 represents the band of frequencies allocated for use by wireless communication systems.

A portion of the available frequencies within band 21, allocated for wireless communication is used for one or more signalling channels 22. The signalling channels are used for the purpose of allowing base stations and subscriber terminals to communicate during call set-up. For example, for sending and receiving signalling information necessary to select a traffic channel 23 to be used for completing the call. A radio link architecture describing the allocation and use of signalling channels is disclosed in a co-pending application filed Aug. 16, 1990 and having Ser. No. 568,148.

The signalling and traffic channels of the wireless communication system may be used in time-division duplex mode. That is, base station and subscriber terminal share the same carrier frequency but alternately transmit so that their transmissions do not overlap. This technique is commonly referred to as "ping-pong".

In regions where there exist overlapping frequencies between those allocated for wireless communication and other fixed services, the base stations can be configured such that during installation, the base station could be registered with either a range of frequencies or a list of channels that cannot be allocated. The problem of sharing frequency spectrum with other services has been discussed in a working paper prepared by the CCIR Interim Working Party 8/13 and is entitled "REPORT ON SHARING CRITERIA BETWEEN FPLMTS AND OTHER SERVICES", Also, certain traffic channels 24 could be reserved for certain types of calls such as, 911, fire department, police, etc. For example, if band 21 comprises a number of channels from, say, 1 to 80, with channels 1–4 and 77–80 used as signalling channels and channels 5 to 10 for essential services, as mentioned above, then, band 25 where channels can be allocated, could as an example, simply be identified as channels 10–76.

Figure 3B:
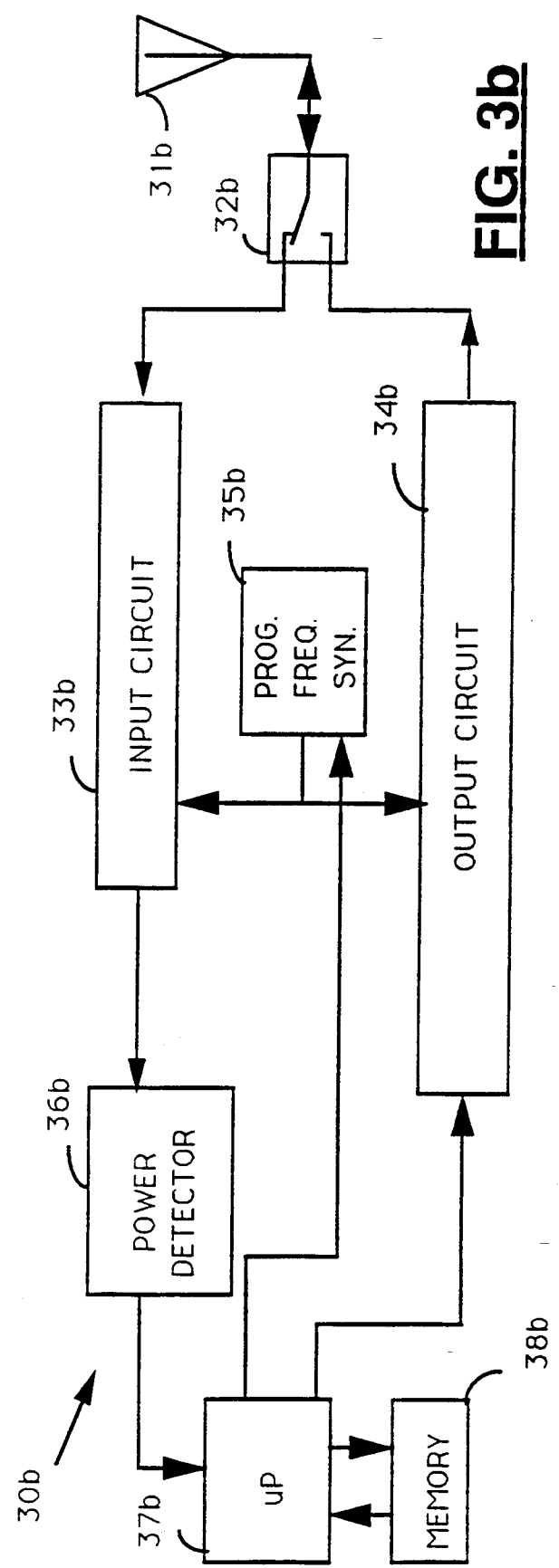

FIGS. 3a and 3b are block diagrams illustrating some of the basic components comprised in a base station shown in FIG. 3a and a subscriber terminal shown in FIG. 3b. Except for external programmable input 39, FIGS. 3a and 3b are identical. Two figures were used in order to illustrate the interaction between the base station 30a and subscriber terminal 30b during a typical call set-up procedure.

In each configuration, a receiving and transmitting antenna 31 is connected via a transmit/receive switch 32 to an input circuit 33 and an output circuit 34. A programmable frequency synthesizer 35 is used in conjunction with the input and output circuits to permit selection of any of the available frequency channels. The construction and operation of the switch 32, input circuit 33, output circuit 34 and synthesizer 35 are well known to those knowledgeable in the art, and need not be described further. The power detector circuit 36 is used in the selection of useable traffic channels. The operations are controlled by a microprocessor 37. Memory 38 is used for storing the list of traffic channels determined to be useable either at the base station 30a or at the subscriber terminal 30b. An external programmable input 39 can be used to register at the base station, those traffic channels which are determined useable as traffic channels, i.e. not reserved for fixed type services.

At the base station 30a, the range of available traffic channels can be registered at input 39 and stored in memory 38a. Of course, this operation could also be done at the factory.

In operation, when a call set-up is attempted between the base station 30a and the subscriber terminal 30b, all available traffic channels are scanned. It is to be noted that the base station could also be configured such that all traffic channels are prescanned. That is, the base station could scan the traffic channels continuously or on a regular interval and thereby maintain a list of useable traffic channels. In the above example, channels 10-80 would each be scanned for the presence of radio power levels above a specified threshold. Scanned traffic channels are selected and processed by means of the programmable frequency synthesizer 35a, in conjunction with the input circuit 33a. The power level of each traffic channel is detected by the power detector circuit 36a. If a scanned traffic channel has a power level below a predetermined threshold, it is selected as a useable traffic channel and stored in memory 38a. In the preferred embodiment, only a certain number of traffic channels would be selected as useable. For example, the base station could be configured to select the first 5 traffic channels determined to be below the threshold. Similarly, the base station could also be configured to select the 5 traffic channels which have the lowest interference level. If there are not sufficient traffic channels with interference below the threshold, then, additional channels with interference levels above the threshold may be selected as well. The traffic channels selected would be those that have the lowest interference levels even though the levels are above the threshold. It will of course be understood that if some of the latter traffic channels are considered to offer inadequate communication between the base station and the subscriber terminal, they would be excluded from the selection. Continuing with the above example, if after having scanned channels 10-80, only channels 53-78 are found to have a power level below the first predetermined threshold, a list of some or all useable traffic channels, is stored in memory 38a. The list of useable traffic channels are sent to the subscriber terminal via a signalling channel (not shown).

At the subscriber terminal 30b, each traffic channel in the list is selected by synthesizer 35b and scanned by input circuit 33b. The power level of each traffic channel in the list is then measured by detector 36b against a second threshold to determine whether it is also useable at the subscriber terminal. Although not essential, the first and second thresholds could be set to the same levels at each of the base station 30a and subscriber terminal 30b. In the preferred embodiment, the traffic channel determined to contain the least power level of those scanned is selected by the subscriber terminal. Once selected, the subscriber terminal sends a message to the base station on the signalling channel providing an indication of which traffic channel was selected. The base station 30a and the subscriber terminal 30b can then switch to that traffic channel and complete the call connection.

If none of the traffic channels in the list where determined to be adequate, a message can be sent to the base station indicating that the call between the subscriber terminal and that base station cannot proceed.

In another embodiment, the subscriber terminal could be designed to select a second best traffic channel for redundancy purposes, such that if the interference level on the first selected traffic channel becomes unacceptable, the subscriber terminal and the base station could be instructed to switch to the second selected traffic channel. This hand-over technique is disclosed in a co-pending application entitled "Improved Hand-Over in Radio Communication Systems with Dynamic Channel Allocation".

Figure 4A:
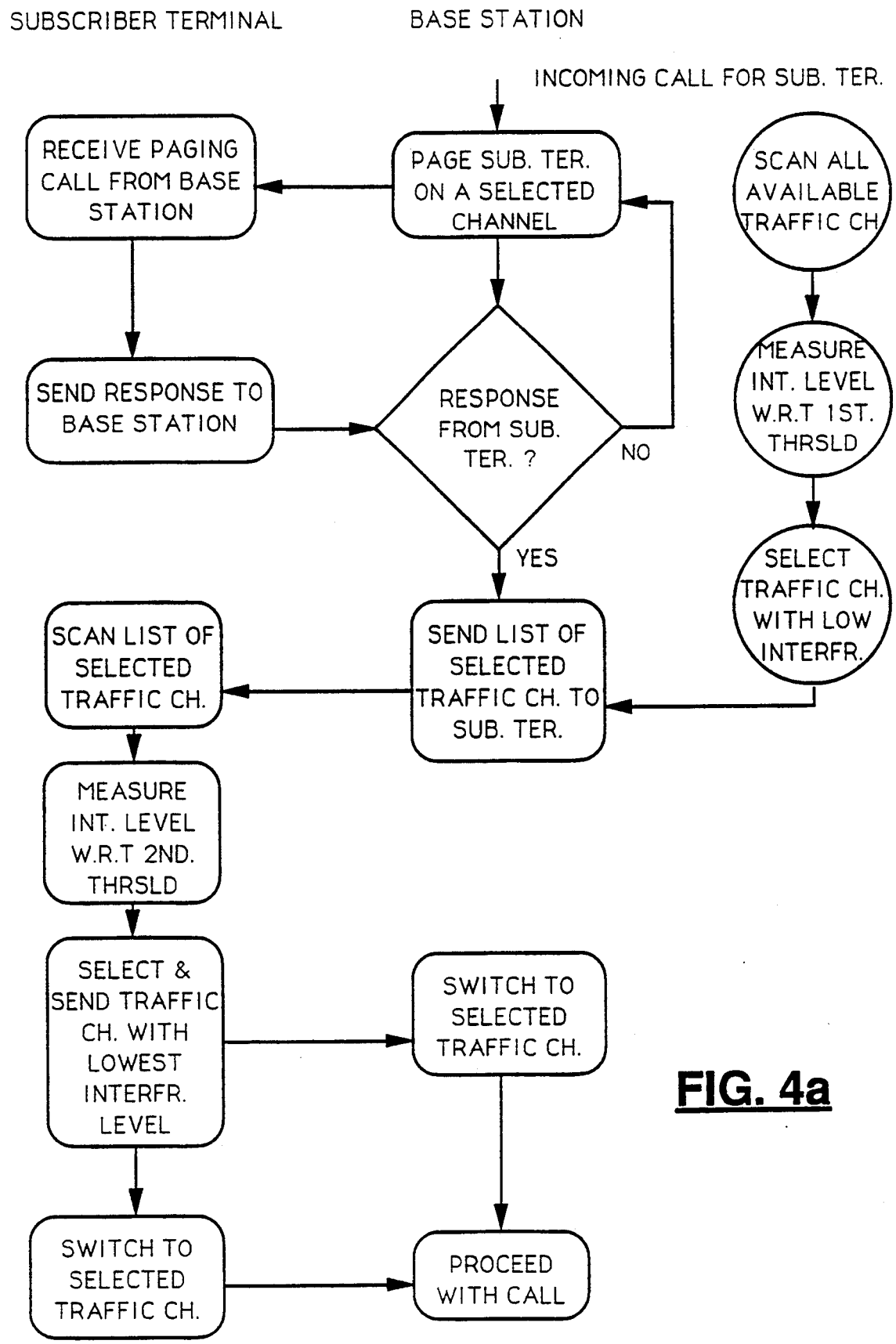
FIGS. 4a and 4b are flow diagrams illustrating the call set-up procedures of the present invention.
Figure 4B:
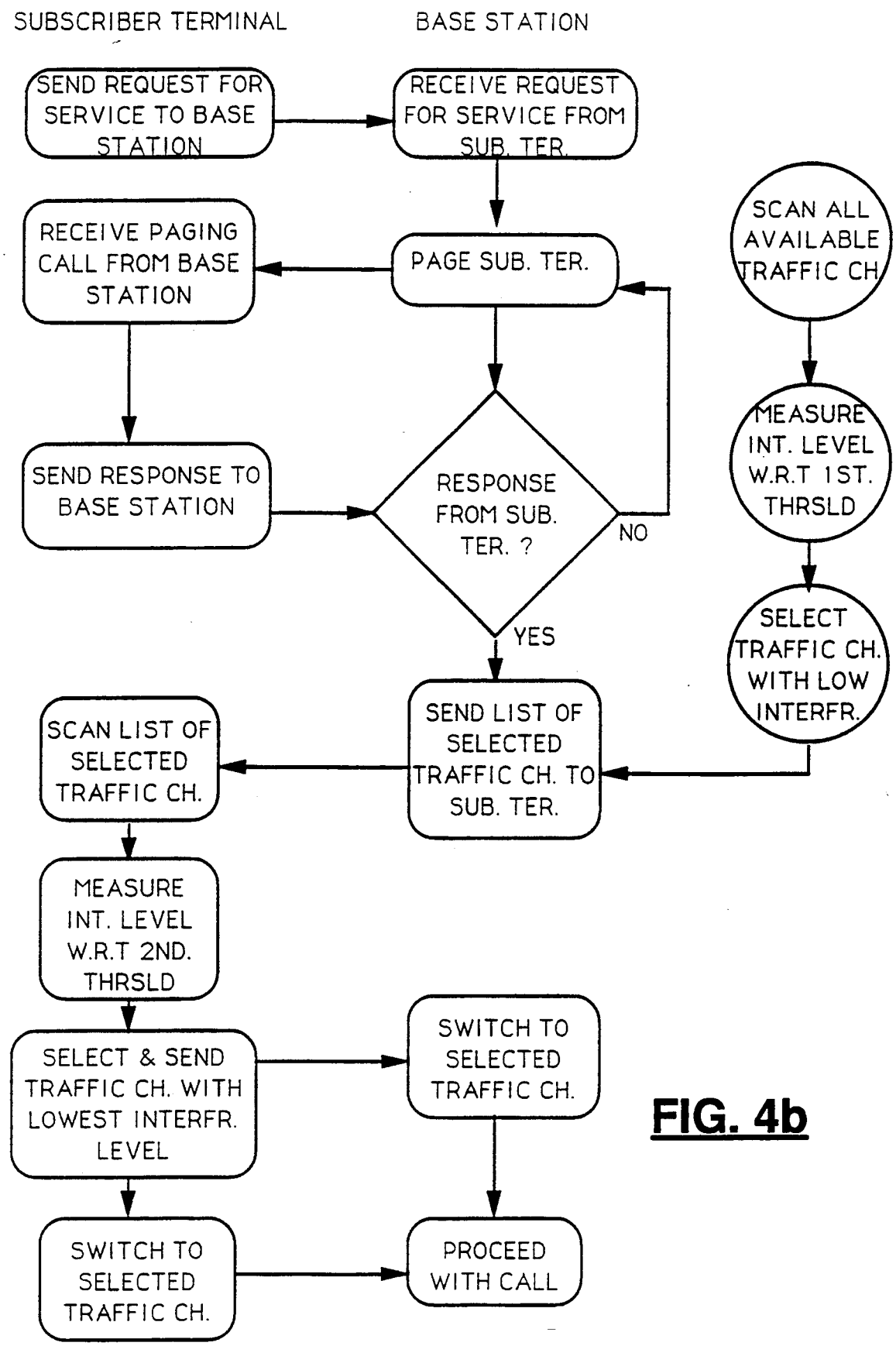

FIGS. 4a and 4b illustrate the flow of information between the base station and a subscriber terminal. In FIG. 4a, the base station receives an incoming call attempt directed to a subscriber terminal. A call set-up initiated by a base station, for example in response to an incoming call from the PSTN to a subscriber registered with that base station, proceeds as follows:

1. The base station pages the subscriber terminal on a signalling channel. The subscriber terminal would normally be monitoring this signalling channel at frequent intervals. The subscriber terminal acknowledges the paging message.
2. The base station then sends the subscriber terminal a list of available traffic channels upon which a call would be acceptable. As indicated above, this list consists of some number of traffic channels of the allocated band for wireless communication systems which contain little or no interference power, as measured by the power detector at the base station.
3. The subscriber terminal informs the base station of which traffic channel it prefers of those presented to it in the list. The preferred channel would be the one containing the least interference power as measured by the subscriber terminal. Note that this would not, in general, be the one with the lowest interference power as measured by the base station, hence the need for measurements by the subscriber terminal.
4. Both base station and subscriber terminal would switch their transceivers to the agreed-upon traffic channel, and the call would proceed.

A call set-up initiated by a subscriber terminal, for example to make an outgoing call, proceeds in the same way, except that the subscriber terminal sends a call request on a signalling channel to a nearby base station. The call set-up proceeds from this point identically to the procedure described above for call set-up initiated by a base station, starting from step 1.

The measurement of the interference power present in each of the remaining traffic channels would be carried out by a receiver at the base station on a frequent basis. The receiver which carries out the scan could be, but need not be, the same receiver which communicates with the subscriber terminal.

We claim:

1. In a radio communication system having a number of base stations, each communicating with a plurality of subscriber terminals over separate traffic channels and each base station having access to each of said plurality of traffic channels, a method of selecting a traffic channel for completing call set-up of incoming and outgoing calls between a base station, a subscriber terminal and the Public Switched Telephone Network (PSTN), comprising the steps of:
- receiving, at said base station, an incoming call attempt from a subscriber or from the PSTN;
- scanning, at said base station, said plurality of traffic channels for the presence of radio power levels above a first specified threshold;
- measuring the power level of a scanned traffic channel;
- selecting from the scanned traffic channels, traffic channels with radio power levels below said first specified threshold;
- storing a list of selected traffic channels;
- sending to the subscriber terminal, along a signalling channel linking the base station and the subscriber terminal, the list of selected traffic channels;
- receiving the list at the subscriber terminal;
- scanning the traffic channels on the list;
- measuring the power level on each scanned traffic channel on said list;
- selecting from the scanned traffic channels of the list, traffic channels with radio power levels below a second specified threshold;
- storing the traffic channel selection at said subscriber terminal;
- sending, to the base station, along the signalling channel, the subscriber terminal's traffic channel selection, which provides an indication of the subscriber terminal's preferred traffic channel and redundant traffic channel to be selected if the preferred traffic channel becomes unusable;
- receiving the traffic channel selection at said base station;
- switching the base station and the subscriber terminal to the preferred traffic channel; and
- proceeding with call connection.

2. A method as defined in claim 1, wherein of the traffic channels scanned at said base station, only a first number of sequentially scanned traffic channels having radio power levels below said first specified threshold are selected and stored in said list.

3. A method as defined in claim 1, wherein each of said plurality traffic channels are scanned at said base station and only a first number of traffic channels having the lowest radio power levels below said first specified thresholds are selected and stored in said list.

4. A method as defined in claim 1, wherein said plurality of traffic channels are scanned by switching said base station on an available frequency channel using frequency synthesizer means.

5. A method as defined in claim 4, wherein said traffic channels are prescanned prior to call set-up attempt.

6. A method as defined in claim 4, wherein said traffic channels are scanned continuously to maintain a list of useable traffic channels.

7. A method as defined in claim 1, further comprising the step of:
- selecting from the scanned traffic channels, traffic channels with radio power levels above said first specified threshold if the number of traffic channels with power levels below said first threshold in insufficient.

8. A method as defined in claim 7, further comprising, at said subscriber terminal, the step of:
- selecting from the scanned traffic channels those traffic channels having the lowest radio power levels.

* * * * *